(12) United States Patent
Buter et al.

(10) Patent No.: US 6,419,187 B1
(45) Date of Patent: Jul. 16, 2002

(54) PROFILE

(75) Inventors: Andreas Buter, Braunschweig; Elmar Breitbach, Gottingen; Ulf-Carsten Ehlert, Braunschweig, all of (DE)

(73) Assignee: Deutsches Zentrum fur Luft-und Raumfahrt e.v., Bonn (DE)

( * ) Notice: Subject to any disclaimer, the term of this patent is extended or adjusted under 35 U.S.C. 154(b) by 0 days.

(21) Appl. No.: 09/164,178

(22) Filed: Sep. 30, 1998

(30) Foreign Application Priority Data

Sep. 30, 1997 (DE) .......................................... 197 43 390
Feb. 4, 1998 (DE) .......................................... 198 04 308

(51) Int. Cl.7 ................................................. B64C 3/00
(52) U.S. Cl. ................... 244/35 R; 244/34 R
(58) Field of Search .......................... 244/35 R, 34 R, 244/198, 123, 124, 201, 219, 133

(56) References Cited

U.S. PATENT DOCUMENTS

| | | | |
|---|---|---|---|
| 3,042,371 A | * 7/1962 | Fanti | ........................ 244/219 |
| 4,868,447 A | 9/1989 | Lee et al. | |
| 5,114,104 A | 5/1992 | Cincotta et al. | ........... 244/35 R |
| 5,137,228 A | 8/1992 | Vaughen | ................... 244/35 R |
| 5,374,011 A | 12/1994 | Lazarus et al. | |
| 5,440,193 A | 8/1995 | Barrett | |
| 5,730,581 A | 3/1998 | Buter | ........................ 244/35 R |

FOREIGN PATENT DOCUMENTS

| | | |
|---|---|---|
| EP | 0 593 160 A1 | 4/1994 |
| FR | 2 737 465 | 2/1997 |

* cited by examiner

Primary Examiner—Charles T. Jordan
Assistant Examiner—Judith A. Nelson
(74) Attorney, Agent, or Firm—Salter & Michaelson

(57) ABSTRACT

In a thin-walled profile with profile variation using anisotropisms due to the material or the structure, the anisotropisms due to the material or the structure are arranged locally in the profile to produce specific changes in the contour.

35 Claims, 3 Drawing Sheets

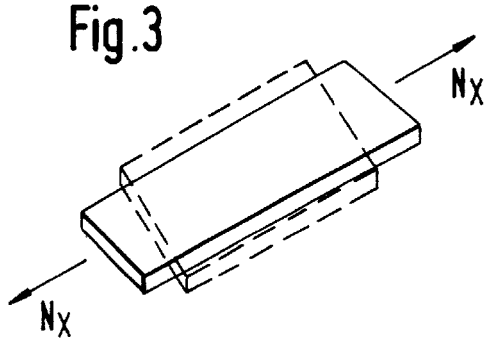
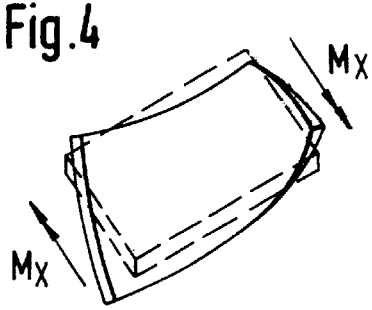
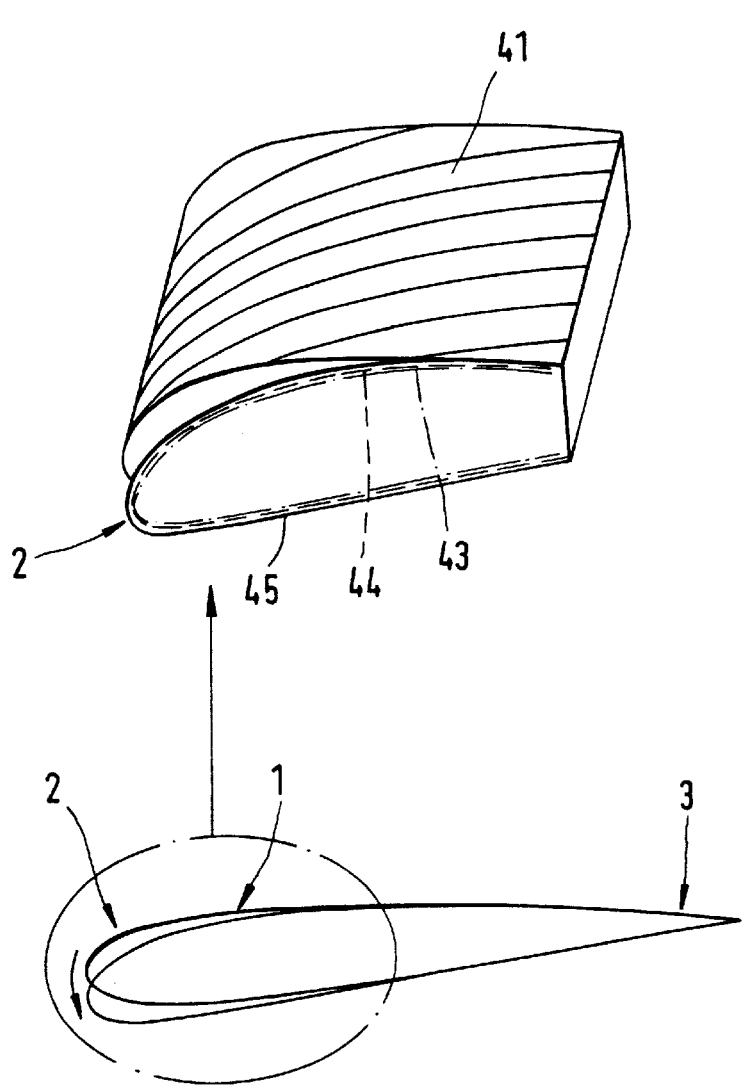

PROFILE

BACKGROUND

1.0 Technical Field

The invention relates to a profile member and, in particular, to a thin-walled profile member having localized material or structural anisotropisms.

2.0 Background of Related Art

It is known to use material or structural anisotropisms to produce global deformation couplings, for example, deformation couplings involving the whole cross-section of a profile, such as the tension-torsion or bending-torsion coupling.

Aerodynamically effective contours, such as wings, rotor blades, propeller blades, compressor and turbine blades or other means are constantly being aerodynamically optimized. But constantly changing loads, caused by unsteady and non-homogeneous flows and causing unsteady lift and resistance forces, also have to be considered. Flaps or slats may be used to control these forces in a known manner.

Where blades of helicopter rotors are used there is an unsteady airflow onto them. As the speed of flight increases so too does the complexity of the flow conditions. In the region at the tip of the blade compression impacts occur at the advancing blade at an angle $\psi$ of approximately 90°, together with a sharp rise in resistance as a result of transonic flow, whereas at the retreating blade at an angle $\psi$ of approximately 270° and a maximum forward-flying speed unsteady shedding of vortices takes place, described as dynamic airflow break-away. The break-away causes a sudden collapse in the lift, giving rise to a temporary, very strong moment load which turns the rotor blade top-heavily around the rotor's axis of rotation and produce s a structural-mechanical load.

There is therefore needed in the art a thin-walled profile with profile variation using material or structural anisotropisms, whereby a further increase in aerodynamic efficiency, a reduction in mechanical loads and a decrease in sound emissions are obtained.

One object of the invention is to provide a thin-walled profile with profile variation using material or structural anisotropisms, whereby an increase in aerodynamic efficiency, a reduction in mechanical loads, and a decrease in sound emissions are obtained.

SUMMARY

In accordance with the present invention, a thin-wall profile is provided in which material or structural anisotropisms are arranged locally in the profile to produce specific changes in contour.

BRIEF DESCRIPTION OF THE DRAWINGS

It should be understood that the drawings are provided for the purpose of illustration only and are not intended to define the limits of the invention. The foregoing and other objects and advantages of the embodiments described herein will become apparent with reference to the following detailed description when taken in conjunction with the accompanying drawings in which:

FIG. 3 is a theoretical perspective sketch representing the elongation-shearing deformation action;

FIG. 4 is a perspective theoretical sketch representing the curving twisting deformation action;

FIG. 5 is a theoretical sketch of a thin-walled profile in an alternative embodiment of the invention, with local anisotropism caused by the material.

DETAILED DESCRIPTION OF THE ILLUSTRATIVE EMBODIMENTS

Figure 1:
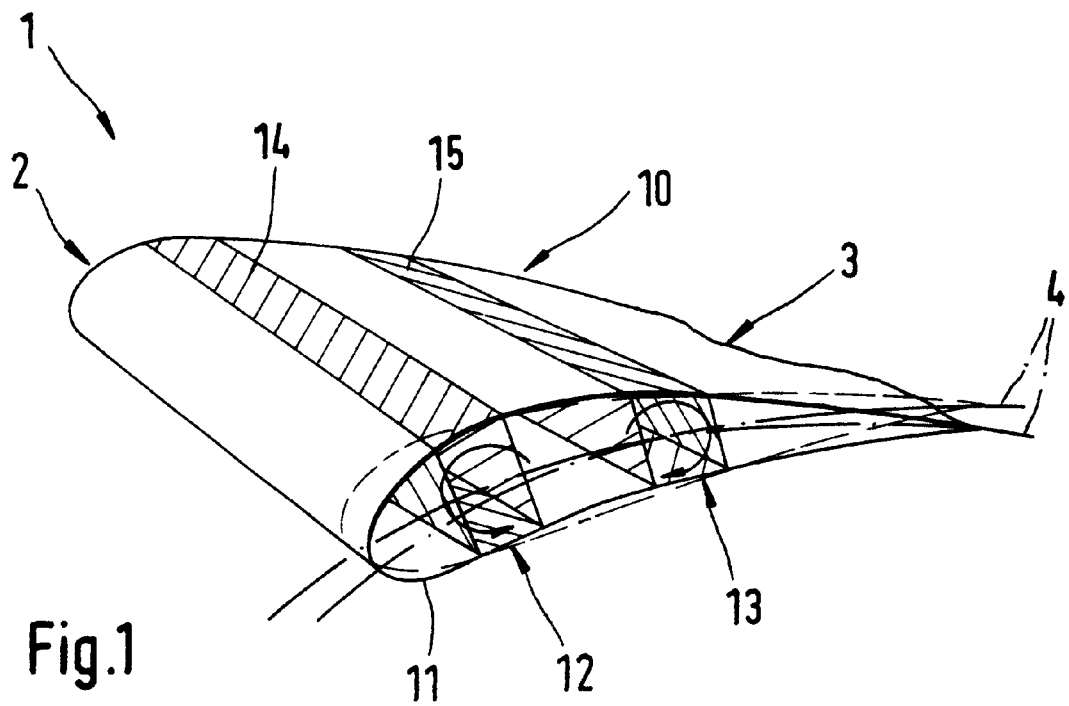
FIG. 1 is a perspective view of a first embodiment of a thin-walled profile according to the invention, with local tension-torsion coupling.

The present invention is directed to a thin-walled profile with material or structural anisotropisms provided locally in the profile to allow the contour of the profile to deform in a predetermined manner. "Anisotropism," as used herein, is used in the conventional sense, meaning a region that has physical properties that are different in different directions, allowing the region to assume different positions in response to external stimuli, such as an external force. The material or structural anisotropism may be, for example, a particular arrangement of material layers in a region of the of the profile. The anisotropisms cause deformation couplings which are used solely at individual components of the profile to deform the shape of the profile cross-section specifically and actively. The profile may, for example, be a single or multiple-cell, particularly thin-walled bar shell with the anisotropisms provided locally at its individual plate strips.

The thin-walled profiles of the present invention may also be provided with actuator means. The actuator means preferably introduce the actuator forces globally into the whole cross-section of the profile and may also introduce those forces locally to individual anisotropic members, such as plate strip members, or the like. The actuator forces may alternatively be introduced through individual or surface forces. Suitable actuator means include, but are not limited to, piezoelectric, magnetostrictive, electrical, electromagnetic, electrostrictive, hydraulic, pneumatic, or acutator means based on shape memory alloys. Actuator means based on shape memory alloys are preferably used to produce longitudinal forces. Preferably, linear actuators or linear drives are used as the actuator means. The actuator means are in each case adapted to the construction spaces, positioning forces and positioning distances which are available according to the specific application.

In the present invention, it is not necessary to use flaps or slats to change the profile contour. Instead, desired contour changes are produced by local material or structural anisotropisms. These local material or structural anisotropisms provide particularly advantageous control of the unsteady lifting and resistance forces which occur on an aerodynamically active profile through unsteady and non-homogeneous flows. Thus, the profile contour can be arched in such a way that the cross-section of the profile in the first approximation remains perpendicular to the axis of a component, particularly a slender one, by changing the curvature of the contour center line or median line. Changing the curvature of the contour center line or median line may preferably be done by a local tension-torsion coupling or a local tension-bending coupling.

Through the contour changes according to the invention, continuously curved smooth profile surfaces without any steps or bends are formed advantageously at flow-mechanically active profile contours. Any disturbance of the flow is considerably reduced compared with conventional flap systems. Control of the aerodynamic properties of the profile contours can advantageously be produced, as can a specific change in the moments of surface inertia and thus the stiffness of thin-walled profiles, especially bar shells Preferably, a profile variation in the form of a change of curvature in the front profile region of the rotor blade is provided by lowering the nose. When active contour deformation is used in the nose region of a helicopter rotor blade profile, the appearance and effects of dynamic airflow breakaway at the retreating rotor blade are advantageously reduced. Through the construction of a thin-walled profile according to the invention, in the form of a rotor blade, the dynamic airflow break-away can advantageously be shifted to larger angles of incidence, thus avoiding the otherwise inevitable loss of lift, reducing strong, pulse-like moment loading of the rotor blade, increasing the maximum speed of forward flight, optimizing the dynamic action of the rotor blade and affecting the aerodynamic center position and thus also the aeroelastic coupling.

In a thin-walled rotor blade profile, local material anisotropisms can preferably be obtained through a suitable wall construction of the nose region of the blade. By introducing longitudinal and/or transverse forces shear deformation, bending or twisting can thus be produced, causing the desired lowering of the nose. A wall construction with a +/−45° layer, 30° layer and +/−45° layer may, for example, be used. Layers with any other orientation angles may also be used.

With the thin-walled profile constructed according to the invention, local profile thickening or tapering can preferably be produced by changing the curvatures of the profile wall. The trans-sonic flow conditions at the profile can be influenced by such local thickening or tapering. By local thickening or tapering in the nose region of the profile the aerodynamic center position and thus, the aerodynamic coupling of the profile may be displaced, thereby influencing the aeroelastic behavior of the profile.

Coupling between dynamic stall and shearing is preferably provided. However, such couplings may also be used between elongation, shearing, curvature and angular twist.

The thin-walled profile according to the invention may, for example, be a supporting wing of fixed wing aircraft, a rotor blade for a rotor-lifted aircraft or wind energy converter. It may equally be fluidically active components of turbines, compressors or pumps of any kind, such as marine propellers and blades or vanes of wind energy converters or turbines, ventilators and blowers, propeller blades, prop fans or fan, compressor and turbine blades. However, the profile may also be a beam or support of any conformation or quite generally a bar shell structure.

In the case of aerodynamic profiles the changes in contour obtained by changing the geometry of the profile may be used to influence the zero lift direction or angle of zero lift.

An interesting embodiment may be obtained, for example, if the changes of contour in the region of the trailing edge of the profile are made in such a way that the upper surface of the profile remains unchanged while the lower surface of the profile is inwardly deformed, so that an S-shaped profile (S-shaped mean line) and/or a particular aerodynamic center stability (minimized variation of aerodynamic center position) is obtained. The combined change of arching and thickness, made possible by the local anisotropisms, have a particularly advantageous effect here.

FIG. 1 is a perspective view of a profile according to the invention in the form of a single or multiple-cell bar shell 10 including a nose region 2 and a trailing edge region 3. Bar shell 10 includes individual cells 12, 13 sheated by a thin wall 11. Other cells may also be provided inside bar shell 10, in addition to the two cells 12, 13 shown in FIG. 1.

Cells 12, 13 are each provided with windings 14, 15 preferably wound helically in opposing directions. Bar shell 10 is preferably constructed entirely in fibre composite style, as are windings 14, 15.

If the two windings 14, 15 are fitted in opposing directions, introduction of a force in an axial direction causes a simultaneous upward or downward movement of the nose region 2 and the trailing edge region 3 of the profile. The axial load produces torsion in each of cells 12, 13 simultaneously, leading to the change of curvature.

FIG. 1 illustrates the non-deformed profile 1 in a dash-and-dot line and the profile deformed by torsion in a continuous line. The torsional forces with an opposed action are sketched in as arrows in opposite directions. The change of curvature can also be seen from the changed position of the center line 4 of the contour or the median line of the profile.

If a helical winding in the same direction were provided for both cells instead of the two oppositely directed helical windings, one cell 12 for example would be loaded in tension and the other cell 13 in compression to obtain uniform arching of the profile. But such a load would also make the profile bend within its own plane. It is therefore found more appropriate to provide the two helical windings in opposite directions in many applications. As the camber of the profile contributes to the aerodynamic properties as well as its angle of incidence, adaptive camber variation utilizing the curvature of a rotor blade as a thin-walled profile in local adaptation to the prevailing flow conditions provides a further method of increasing the aerodynamic efficiency, for example, of a wind energy converter.

In adaptive camber variation, in contrast to adaptive twisting, the power demand for the whole system cannot be derived directly from the operating conditions of a wind energy converter. Accurate design of adaptive camber variation requires detailed aerodynamic studies, revealing which profiles are suitable for such a design and which camber parameters have to be varied. The maximum camber, the position of maximum camber and flexible leading and/or trailing edges have to be considered here.

Figure 2:
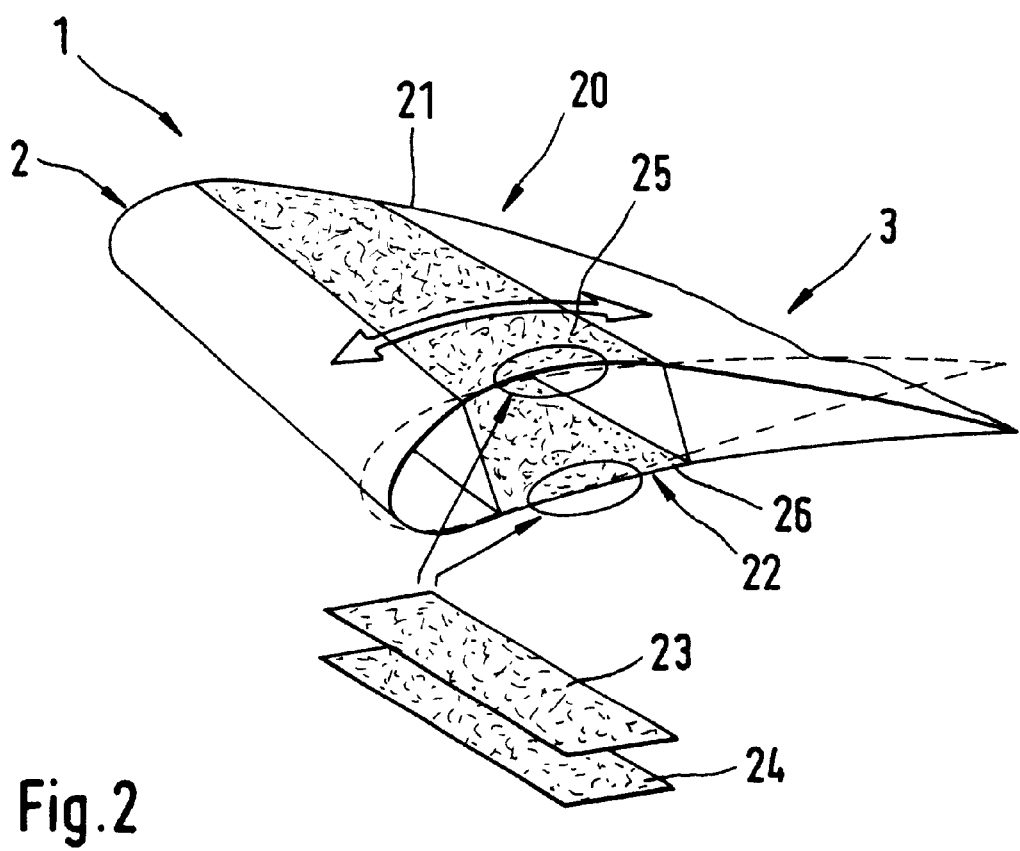
FIG. 2 is a perspective view of a thin-walled profile constructed according to the invention, with local tension-bending coupling.

The same actuator means as may be provided for adaptive twisting are preferably used for producing adaptive arching. Instead of having a tension-torsion coupling by providing a bar shell with two cells 12, 13 as described in connection with FIG. 1, adaptive arching may be obtained with a tension-bending coupling as shown in FIG. 2. FIG. 2 is a perspective view of a profile 2 of a bar shell 20 with a thin wall 21 sheathing a cell 22. Cell 22 includes an upper fibre layer 23 and a lower fibre layer 24. The upper layer is, for example, a +/−45° fibre layer whereas the lower fibre layer 24 may be, for example, a unidirectional 90° or 0° fibre layer.

Figure 6:
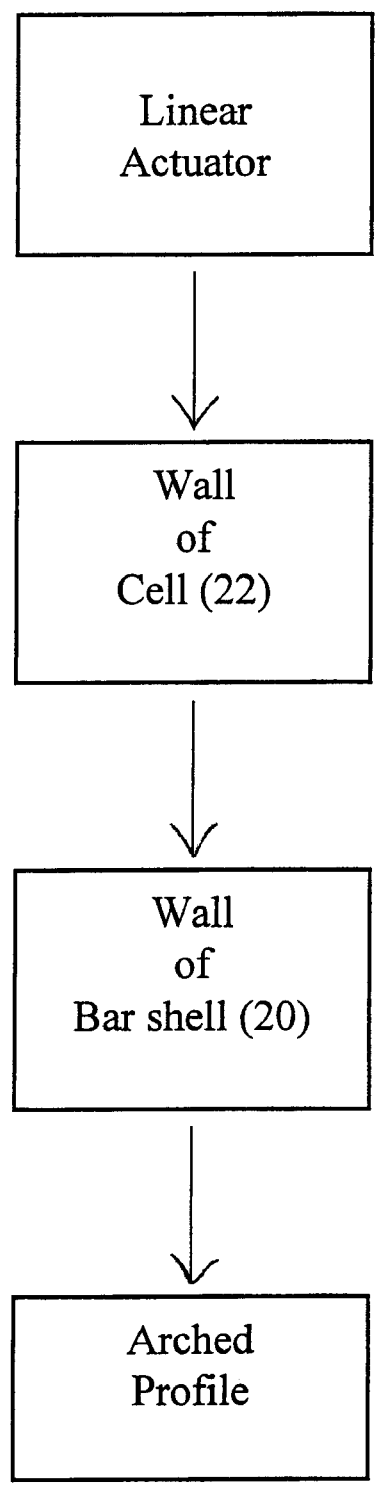
FIG. 6 is a block diagram showing an arrangement of a linear actuator with respect to arching of the profile of FIG. 2.

A linear actuator (shown in block in FIG. 6) is provided as the actuator means in the axis of the profile 2 and perpendicular to the cross-sectional surface of the profile. This type of arrangement is suitable for a unidirectional 90° fibre layer 24. Actuation of the linear actuator, which acts on the wall of cell 22 and thus on wall 21 of bar shell 20, causes bending in the direction of the arrow, thus providing the desired arching of the profile.

If fibre layer 24 is a unidirectional 0° layer, the linear actuator is arranged perpendicular to the axis of the profile in order to produce active arching within the cross-section of the profile. In both cases the axial loading by the linear actuator leads directly to the desired bowing of the profile.

Cell 22 may, for example, be resistant to bending. The layers of fibre composite which produce the bending are incorporated in its top 25 and bottom 26 as an asymmetrical layered structure.

Maximum possible arching of the profile depends on the dimensions of the bar shell as well as the thickness, stiffness and distribution of the individual layers sheathing the individual cells. It is particularly preferred to have local tension-bending coupling as the deformation coupling, incorporated in the trailing edge region 3 of an aerodynamic profile and thereby providing a flexible trailing edge. The local tension-bending coupling may alternatively be arranged in the nose region 2 of the profile.

FIG. 3 and FIG. 4 show the various possibilities for deformation of a member with anisotropism due to its structure or material when various forces are exerted. FIG. 3 shows a substantially parallelepiped member acted on at both sides by tensile forces $N_x$. The member is thereby stretched. The anisotropism also causes shearing of such a member, indicated in broken lines.

FIG. 4 shows deformation of the member through the action of moments $M_x$. These result firstly in curvature and secondly also in twisting of the member as illustrated in continuous lines.

The couplings of an anisotropic laminate, such as may be used for the cells according to the invention as in FIGS. 1 and 2, may be represented, for example, the following system of equations:

$$\begin{pmatrix} n_z \\ n_s \\ t_{zs} \\ m_z \\ m_s \\ m_{zs} \end{pmatrix} = \begin{bmatrix} D_{11} & D_{12} & D_{13} & K_{11} & K_{12} & K_{13} \\ & D_{22} & D_{23} & K_{12} & K_{22} & K_{23} \\ & & D_{33} & K_{13} & K_{23} & K_{33} \\ & & & B_{11} & B_{12} & B_{13} \\ & & & & B_{22} & B_{23} \\ \text{sym.} & & & & & B_{33} \end{bmatrix} \cdot \begin{pmatrix} \varepsilon_z \\ \varepsilon_s \\ \gamma_{zs} \\ K_z \\ K_s \\ K_{zs} \end{pmatrix} = \begin{bmatrix} D & K \\ K & B \end{bmatrix} \cdot \begin{pmatrix} \varepsilon_z \\ \varepsilon_s \\ \gamma_{zs} \\ K_z \\ K_s \\ K_{zs} \end{pmatrix}$$

The load introduced into the laminate (longitudinal and transverse forces $n_z$, $n_s$, torsional forces $t_{zs}$, and moments $m_z$, $m_s$, $m_{zs}$) is represented vectorially here. It corresponds to a laminate-dependent stiffness matrix multiplied by a vector which represents the corresponding deformation. The first variable in the vector gives the longitudinal stretch $\varepsilon_z$, the second the transverse stretch $\varepsilon_s$, the third the $\gamma_s$ distortion, the fourth the longitudinal curvature $K_z$, the fifth the transverse curvature $K_s$ and the sixth the angular twist $K_{zs}$.

FIG. 5 contains a perspective view and a side view of another embodiment of a thin-walled profile 1 according to the invention. In the case illustrated, the nose region 2 of the profile 1 has to be capable of active deformation. In this way, in a helicopter for example, the occurrence and effects of dynamic airflow break-away at the backwardly moving blade can be lessened in the trailing edge region 3.

The structure of a wall 41 sheathing the profile 1 is suitably provided to obtain active deformability of the nose region through material anisotropisms. In the case illustrated an inner layer 43 made of a +/−45° fabric, a central layer 44 made of a 30° unidirectional material and an outer, sheathing layer 45 made of a +/−45° fabric is provided.

When the profile is deformed in a longitudinal direction through an actuator means engaging into or onto it, tensile deformation is thereby produced in wall 41. This in turn causes the desired deformation of the nose region.

Local thickening or tapering of the profile can be produced with a similar structure, as illustrated in FIG. 5. The thickness distribution of the profile is a defining value for the aerodynamic properties of the aerodynamic profile.

The actuator means may again be inserted in the nose region of the profile in order to control the position of the aerodynamic center of the profile. In this way it becomes possible specifically to influence the consequences of aeroelastic effects.

The profile may be thickened locally in that region by axial tension. Loading in compression in that region conversely leads to a reduction in the thickness of the profile. Slight changes in thickness, within the range of a few millimeters, particularly about one millimeter, can be obtained with such a structure. For greater thickening corresponding actuators are preferably used.

If adaptive variation of the thin-walled profile in accordance with the invention is provided, noise reduction may also be obtained, for example, in wind energy converter. The change in profile may be restricted to the acoustically relevant tip of the profile, particularly the tip of a rotor blade, thereby minimizing the inevitable loss of power. In studying the acoustics of the profile, particularly the acoustics of a rotor blade, the profile parameters particularly suitable for minimizing sound production are then preferably established. This enables the adaptive profile variation also to be used for reducing sound emissions, through appropriate adaptation of control algorithms.

It will be understood that various modifications may be made to the embodiment disclosed herein. Therefore, the above description should not be construed as limiting, but merely as exemplifications of a preferred embodiment. Those skilled in the art will envision other modifications within the scope and spirit of the invention.

What is claimed is:

1. A thin-walled profile with profile variation using a material anisotropism comprising:

a material anisotropism arranged locally in the profile to produce specific changes in the contour.

2. The profile of claim 1, further comprising at least one actuator arranged to introduce a force globally.

3. The profile of claim 1, further comprising at least one actuator arranged to introduce a force at an anisotropism.

4. The profile of claim 1, further comprising at least one actuator arranged to introduce a force into the profile through individual forces or through surface loads.

5. The profile of claim 2, wherein the at least one actuator is selected from the group consisting of piezoelectric, magnetostrictive, electrical, electromagnetic, electrostrictive, hydraulic, pneumatic, and shape memory alloys.

6. The profile of claim 5, wherein the at least one actuator is a linear actuator.

7. The profile of claim 1, wherein the profile is a bar shell including at least one cell.

8. The profile of claim 7, wherein the at least one cell is sheathed by a winding, the winding adapted to respond to an axial force introduced into the cell by introducing a torsional moment to change the curvature of the profile and oppositely directed in the cells.

9. The profile of claim 7, wherein the at least one cell includes layers with a predetermined orientation, and these layers are fixed to a wall of the bar shell such that upon introduction of an axial force into the profile, the wall of the contour bends and the curvature of the median line changes.

10. The profile of claim 7, wherein the the at least one cell of the bar shell includes one or more +/−45° fabric layers in adjacent relation to a unidirectional 90° and/or 0° layer.

11. The profile of claim 7, wherein the measure of the change in contour of the profile is dependent on the dimensions of the bar shell and the thickness and stiffness of the individual layers of the walls of the at least one cell.

12. The profile of claim 1, wherein the profile undergoes a specific change in the moments of surface inertia and stiffnesses, the aerodynamic properties of which are controllable by changing the bending of the wall.

13. The profile of claim 1, wherein the profile includes a nose region, the nose region comprising a material anisotropism including at least two different material layers, such that longitudinal and/or transverse forces introduced produce shear deformation and lower the nose region.

14. The profile of claim 1, wherein the curvature of at least a portion of the wall of the profile may be thickened or tapered by material or structural anisotropisms.

15. The profile of claim 1, wherein the profile is a wing of fixed wing aircraft or a rotor blade for a rotor-lifted aircraft or wind energy converter.

16. The profile of claim 1, wherein the profile is a fluid mechanically effective component of one of the group consisting of turbines, compressors, pumps, marine propellers, wind energy converter blades, turbine blades, ventilator blades, blower blades, propeller blades, prop fan blades, fan blades, compressor blades, and turbine blades.

17. The profile of claim 1, wherein the profile is a beam, support or bar shell structure.

18. The profile of claim 1, wherein the profile is aerodynamic and the changes in contour are used to influence the zero lift direction.

19. The profile of claim 1, wherein the profile includes a an upper surface, a lower surface, and a trailing edge, and changes in the contour in the region of the trailing edge of the profile are made in such a way that the upper surface of the profile remains unchanged while the lower surface of the profile is inwardly deformed, to obtain an S-shaped profile and/or a particular reduction of the aerodynamic center's variation stability.

20. The profile of claim 7, wherein the at least one cell includes walls with at least one helical winding adapted to effect a predetermined change in the curvature of the contour in response to the introduction of a force.

21. The profile of claim 20, wherein the change in the curvature of the contour is in a contour center line of the profile.

22. A thin-walled profile comprising:

a cross-section with an external outline, actuator means; and material anisotropisms;

wherein the outline is selectively variable by the actuator means and the anisotropisms are constructed and arranged as a plurality of single discrete elements, such that by the elements the outline of the cross-section of the profile is locally variable.

23. The profile of claim 22, wherein the profile comprises a fiber reinforced material.

24. A thin-walled profile, comprising:

a material anisotropism positioned in a localized region of the profile, the material anisotropism being responsive to a force acting upon the profile to produce localized changes in the contour of the profile by introducing a force into the localized region of the profile.

25. The profile of claim 24, wherein the material anisotropism comprises a first fabric layer and a second fabric layer adjacent to the first, the first material layer having a different orientation than the first.

26. The profile of claim 25, wherein the first and second fabric layers are fixed to a region of the wall of the profile such that upon introduction of an axial force into the profile, the wall of the contour bends and the curvature of the median line changes.

27. The profile of claim 25, wherein the material anisotropism is a cell that includes at least one helical winding.

28. The profile of claim 25, wherein orientation of the first fabric layer is +/−45° and the orientation of the second fabric layer is 90° and/or 0°.

29. The profile of claim 25, wherein the localized region is a nose region of the profile.

30. The profile of claim 29, wherein the material anisotropism is responsive to the introduction of forces to produce shear deformation and lower the nose region;

wherein the forces are selected from the group consisting of longitudinal forces, transverse forces, and combinations thereof.

31. The profile of claim 24, further comprising a structural anisotropism responsive to a force acting upon the profile to produce localized changes in the contour of the profile by introducing a force locally into the profile.

32. The profile of claim 31, wherein the structural anisotropism is an actuator.

33. The profile of claim 25, further comprising a structural anisotropism responsive to a force acting upon the profile to produce localized changes in the contour of the profile by introducing a force locally into the profile.

34. The profile of claim 25, wherein the structural anisotropism is an actuator.

35. The profile of claim 26, wherein first and second fabric layers having a thickness and a stiffness, and the thickness and stiffness of the fabric and the dimensions of the profile determine the change in contour of the profile.

* * * * *